(12) United States Patent  
Chambers et al.

(10) Patent No.: US 7,043,006 B1  
(45) Date of Patent: May 9, 2006

(54) DISTRIBUTED CALL PROGRESS TONE DETECTION SYSTEM AND METHOD OF OPERATION THEREOF

(75) Inventors: L. David Chambers, Garland, TX (US); Steve E. Dye, Richardson, TX (US); James G. Osborn, Allen, TX (US)

(73) Assignee: Aastra Intecom Inc., Frisco, TX (US)

( * ) Notice: Subject to any disclaimer, the term of this patent is extended or adjusted under 35 U.S.C. 154(b) by 778 days.

(21) Appl. No.: 10/074,813

(22) Filed: Feb. 13, 2002

(51) Int. Cl.
*H04M 1/64* (2006.01)

(52) U.S. Cl. ............ 379/265.02; 379/265.09; 379/266.08

(58) Field of Classification Search ............... 379/265.01–265.14, 266.01–266.1, 418, 379/283
See application file for complete search history.

(56) References Cited

U.S. PATENT DOCUMENTS

| | | | | |
|---|---|---|---|---|
| 5,724,420 A * | 3/1998 | Torgrim | | 379/372 |
| 5,796,791 A * | 8/1998 | Polcyn | | 379/265.09 |
| 6,097,796 A * | 8/2000 | Tanaka | | 379/100.06 |
| 6,173,054 B1 * | 1/2001 | Beyda et al. | | 379/386 |
| 6,259,691 B1 * | 7/2001 | Naudus | | 370/352 |
| 6,400,709 B1 * | 6/2002 | Yousseff | | 370/352 |
| 6,463,148 B1 * | 10/2002 | Brady | | 379/265.01 |
| 6,587,557 B1 * | 7/2003 | Smith | | 379/265.01 |
| 6,611,583 B1 * | 8/2003 | Gainsboro | | 379/188 |
| 6,704,378 B1 * | 3/2004 | Jagger et al. | | 375/346 |
| 6,782,363 B1 * | 8/2004 | Lee et al. | | 704/248 |
| 6,807,405 B1 * | 10/2004 | Jagger et al. | | 455/296 |
| 6,850,602 B1 * | 2/2005 | Chou | | 379/80 |
| 2002/0006137 A1 * | 1/2002 | Rabenko et al. | | |
| 2002/0031205 A1 * | 3/2002 | Kicklighter et al. | | |
| 2002/0076034 A1 * | 6/2002 | Prabhu et al. | | |
| 2002/0116186 A1 * | 8/2002 | Strauss et al. | | 704/233 |
| 2003/0076943 A1 * | 4/2003 | Das et al. | | |
| 2003/0086541 A1 * | 5/2003 | Brown et al. | | |
| 2004/0181402 A1 * | 9/2004 | Bartkowiak | | |

* cited by examiner

*Primary Examiner*—William J. Deane, Jr.

(57) ABSTRACT

A distributed call progress tone detection system and method of operation thereof. In one embodiment, the system includes a switching partition having line interface modules, a call progress tone detector configured to perform call progress tone detection analysis, and an input-output distributor configured to employ a circuit to interconnect the call progress tone detector and a first of the line interface modules. The system further includes a main control unit configured to receive requests from an application over a packet network, transmit call and control processing commands to the switching partition, create an interconnection between the first of the line interface modules and a second of the line interface modules based on an indication generated by the call progress tone detector and notify the application of the interconnection.

48 Claims, 12 Drawing Sheets

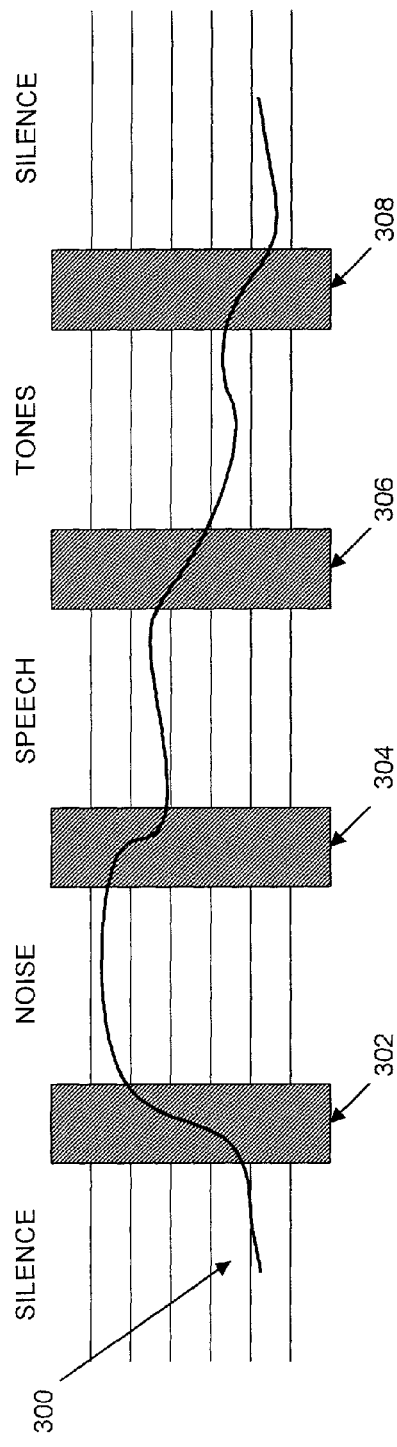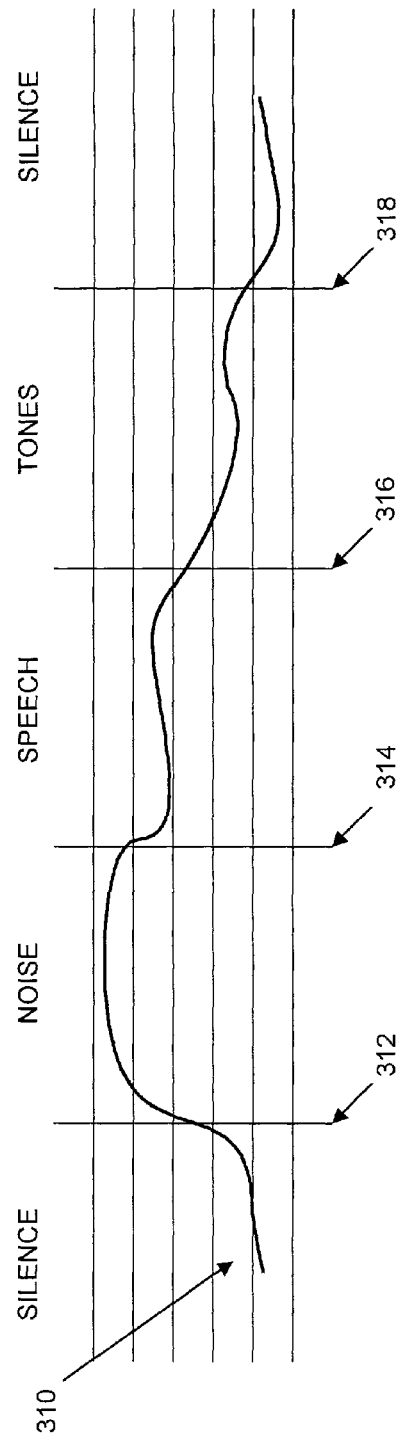

DISTRIBUTED CALL PROGRESS TONE DETECTION SYSTEM AND METHOD OF OPERATION THEREOF

TECHNICAL FIELD OF THE INVENTION

The present invention is directed, in general, to communications systems and, more specifically, to a distributed call progress tone detection system couplable to a packet network and a method of operating the same.

BACKGROUND OF THE INVENTION

Conventional switching platforms are advantageously employed in telecommunications systems to facilitate, for instance, private branch exchange (PBX) administered inter-office communications or switching and call queuing functionality for a call center. Call centers are employed in a multitude of applications such as telemarketing, customer service and sales support applications. A call center is typically embodied in a central location wherein inbound calls, outbound calls, or a combination thereof are processed by an organization in association with computer automation. The call center generally employs a number of agents who communicate with customers via telephone, facsimile, electronic mail, or other communication techniques or devices. The call center has the ability to handle a considerable volume of communication traffic at the same time in association with automation techniques such as call routing and equitable distribution, call screening, agent skill matching, and other resource optimization and management reporting functionality.

A switching platform employable with a call center typically includes a computer server system that provides call and control processing functions for the call center. The computer server system may employ a number of input-output distributor cards connectable via a multibus interface. Each input-output distributor card provides an interface from a main control unit to a switching matrix, which is capable of controlling a number of line cards. The line cards provide the physical interface to access nodes, which may include digital and analog instruments and digital and analog trunks.

The call centers that employ a switching platform, however, suffer from a number of deficiencies. More specifically, the call centers have a problem in determining if a person answered the phone call. In a typical call center, a call center application makes a call to a recipient via the switching platform. The switching platform then determines when the call at the receiving is answered and informs a call center application. Then, the call center application must find an available agent and inform the call center's computer server system to connect the agent to the phone call. The time between the phone call being answered and an agent connecting to the phone call could be a noticeable period of time. If a person answered the call, the person would hear a period of silence and may cause the person to hang-up. Thus, the call center would lose a potential customer.

Another call center deficiency is not being able to determine what answered the phone call. If the call center application does not know if a person answered the call, an agent could be connected to an answering machine instead of a person. This could result in a loss of another potential customer.

Accordingly, what is needed in the art is a system that overcomes the deficiencies of the prior art.

SUMMARY OF THE INVENTION

To address the above-discussed deficiencies of the prior art, the present invention provides a distributed call progress tone detection system couplable to a packet network and a method of operating the same. In one embodiment, the distributed call progress tone detection system includes a switching partition couplable to the packet network and having line interface modules configured to provide an interface to corresponding access nodes and a call progress tone detector configured to perform call progress tone detection analysis and generate an indication thereof. The switching partition also includes an input-output distributor configured to employ a circuit to interconnect the call progress tone detector and a first of the line interface modules to allow the call progress tone detector to perform the call progress tone detection analysis with respect to the first of the line interface modules.

The distributed call progress tone detection system further includes a main control unit configured to receive requests from an application over the packet network, transmit call and control processing commands to the switching partition, create an interconnection between the first of the line interface modules and a second of the line interface modules based on the indication and notify the application of the interconnection. For the purposes of the present invention, the phrase "configured to" means that the device, the system or the subsystem includes the necessary software, hardware, firmware or a combination thereof to accomplish the stated task.

The present invention introduces, in one aspect, a distributed call progress tone detection system employable in a packet network. The distributed call progress tone detection system includes a switching partition having a input-output distributor and line interface modules to provide connectivity to a circuit switched environment over a packet-based network. Thus, the switching platform provides the advantages normally associated with a circuit switched environment, while, at the same time, transporting communications control data packets containing call set-up/tear-down and other interim and related call processing and control messages over a packet network.

The distributed call progress tone detection system also can monitor calls employing a call progress tone detector to determine the process of a call, such as generating an indication that a person answered the call. Depending upon the progress of the call, the distributed call progress tone detection system may also find an available agent, associated with a line interface module, and interconnect the agent with the call and notify an application of the interconnect and/or the call progress indication. Previous calling systems required that the application had to assign an agent to the call thus incurring additional time before an agent would answer the call. The present invention advantageously reduces the amount of time required for an agent to answer a call by finding an available agent without waiting for a command from the application and then notifying the application of the interconnection.

In one embodiment of the present invention, the call progress tone detector includes energy detection. In a related embodiment, the call progress tone detector includes energy detection with guard band elimination. Energy detection with guard band elimination may be used to determine, for instance, if a person is speaking, a machine is playing a recorded message or if there is silence.

In one embodiment of the present invention, the call progress tone detector is further configured to receive at least one tunable parameter and adjust the call progress tone detection analysis on a call-by-call basis thereof. The at least one tunable parameter, in one embodiment, is selected from the group consisting of: (1) a software answer detect time, (2) a hardware answer detect time, (3) a ring no answer time, (4) a minimum call answer time, (5) a recorded human speech detect time, (6) a maximum resource wait time, and (7) a pause wait time after speech detected. Of course, however, other parameters may be used to adjust the call progress tone detection analysis on a call-by-call basis.

The call progress tone detector, in one embodiment, generates an indication that is selected from the group consisting of: (1) a busy tone, (2) a reorder tone, (3) a ring back tone with no answer, (4) a human speech with answer quickly, (5) a human speech with pause detected after speech, (6) a recorded human speech, (7) a facsimile/modem, (8) a Telco Intercept, and (9) a no energy detected before answer detect time expired. In other embodiments, the call progress tone detector may generate other types of indications in addition to or in place of the indications listed above.

In one embodiment of the present invention, the line interface modules are dynamically configurable via program downloads. The line interface modules may contain field programmable gate arrays and/or microprocessors, such as digital signal processors, that can be configured via the downloaded programs. Of course, however, other types of line interface modules capable of interfacing with telecommunication equipment are well within the broad scope of the present invention.

In one embodiment of the present invention, the call progress tone detector may be embodied within at least one of the line interface modules. The call progress tone detector, in another embodiment, may be embodied within software downloaded to at least one of the line interface modules. The line interface modules, in yet another embodiment, may be universal interface modules that can be dynamically configured to be a line interface, a call progress tone detector, a tone generator or other telecommunication type modules.

The main control unit, in one embodiment, may employ call and control processing commands that selected from the group consisting of: (1) a no answer supervision command, (2) a use network answer supervision command, (3) a best try full analysis command, and (4) a full call progress analysis command. The main control unit may use the control processing commands to control the use of the call progress tone detector and the type of processing to be performed after performing the call progress tone analysis. Of course, however, other control processing commands are within the broad scope of the present invention.

The main control unit may further notify the application of the indication generated by the call progress tone detector. In a related embodiment, the main control unit may concurrently interconnect the first and second line interface modules and notify the application of the interconnect and/or indication.

In one embodiment of the present invention, the main control unit is further configured to auto-terminate a call on the first of the line interface modules if an access node coupled to the second of the line interface modules is unavailable. In a related embodiment, a timeout period, associated with an availability of the access node, elapses before the main control unit auto-terminates the call. Of course, however, other conditions may be used to auto-terminate the call.

In one embodiment of the present invention, distributed call progress tone detection system further includes the application and wherein the application is selected from the group consisting of: (1) a non-predictive dialer, (2) a predictive dialer, (3) an answering machine dialer, and (4) a call center. The application, upon receiving the notification from the main control unit, may transmit information associated with the request to a terminal coupled to a third of the line interface modules that is associated with the second of the line interface modules.

In one embodiment of the present invention, the circuit is a circuit-switched matrix configured to control and selectively interconnect the line interface modules and the call progress tone detector. Of course, however, other types of circuits or modules may be used to control and selectively interconnect the line interface modules and the call progress tone detector.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3A illustrates an example of a signal employable with a call progress tone detector having energy detection in accordance with the principles of the present invention;

FIG. 3B illustrates an example of a signal employable with a call progress tone detector having energy detection with guard band elimination in accordance with the principles of the present invention;

DETAILED DESCRIPTION

Figure 1:
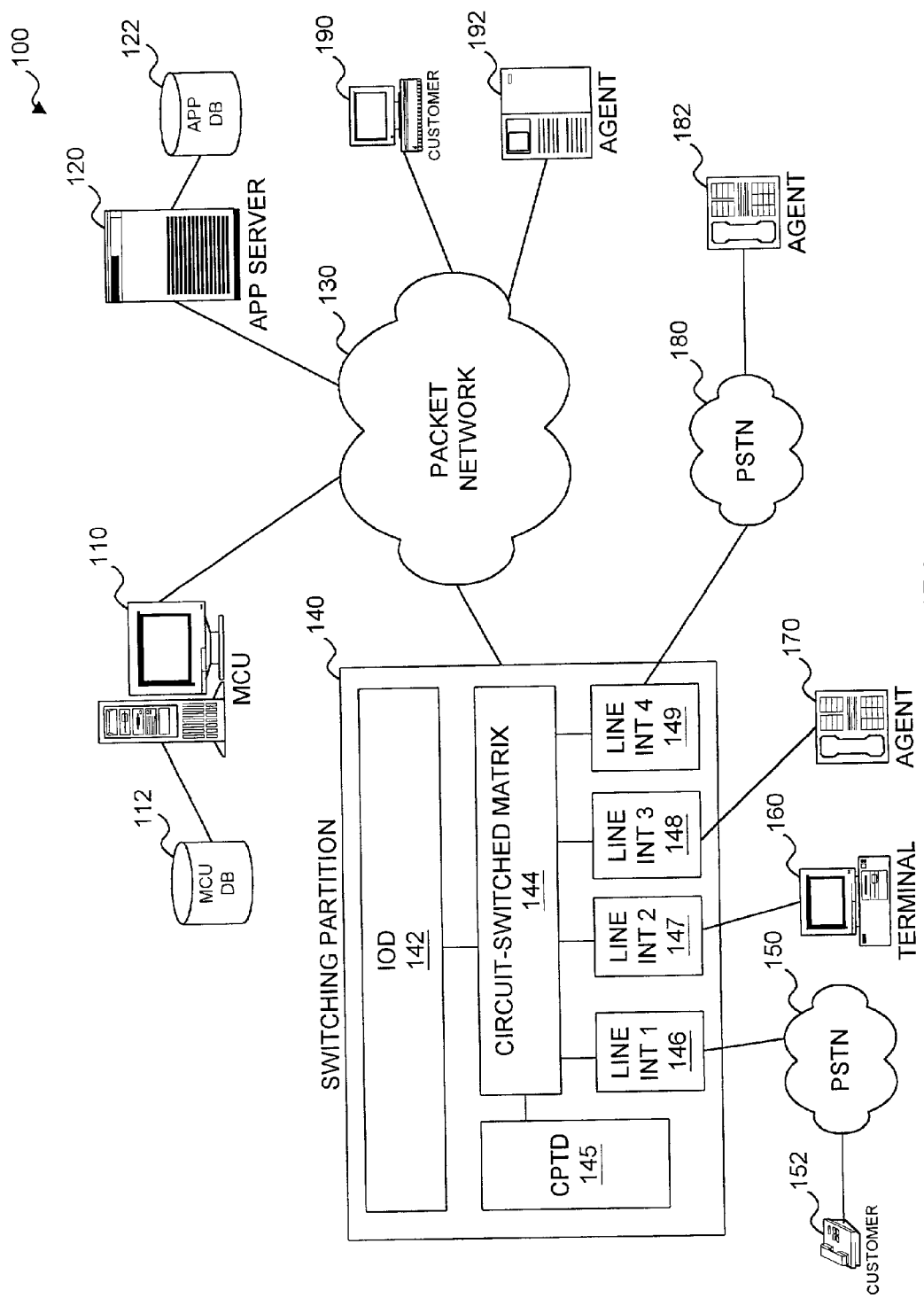
FIG. 1 illustrates a block diagram of an embodiment of a distributed call progress tone detection system constructed in accordance with the principles of the present invention.

Referring initially to FIG. 1, illustrated is a block diagram of an embodiment of a distributed call progress tone detection system, generally designated 100, constructed in accordance with the principles of the present invention. The distributed call progress tone detection system 100 may include a switching partition 140. The switching partition 140, in one embodiment, includes line interface modules 146, 147, 148, 149 configured to provide an interface to corresponding access nodes. For the purposes of the present invention, the phrase "configured to" means that the device, the system or the subsystem includes the necessary software, hardware, firmware or a combination thereof to accomplish the stated task. The line interface modules 146, 147, 148, 149 may also be dynamically configurable via program downloads. For example, each of the line interface modules 146, 147, 148, 149 may be downloaded with different programs allowing each of the line interface modules 146, 147, 148, 149 to perform different functions, to interface with different types of access nodes or to interface with different types of transmission media.

In the illustrated embodiment, the first line interface module 146 is coupled to a Public Switched Telephone Network ("PSTN") 150 that may be used to connect to an access node that is a customer station 152, such as a telephone. The second line interface module 147 is coupled to an access node that is a terminal 160. The terminal 160 may be a conventional computer system that is capable of displaying information associated with the customer station 152, such as a person's name, address and sales related information. Of course, however, the terminal 160 is not limited to the information described above. In other embodiments, the terminal 160 may display additional or different data and may also include specialized applications.

The third interface module 148 is coupled to an access node that is an agent station 170. The agent station 170 may be a telephone station or any other device or combination of devices that allows an agent (e.g., a person) to communicate with a customer via the distributed call progress tone detection system 100. The fourth interface module 149 is coupled an agent station 182 via a PSTN 180. Of course, however, the present invention is not limited to four line interface modules and the types of access nodes described above. Other embodiments of the present invention may have any number of line interface modules that are configured to provide an interface to different types of access nodes.

The switching partition 140 includes a call progress tone detector ("CPTD") 145 that is configured to perform call progress tone detection analysis. Call progress tone detection analysis includes monitoring a call, determining the progress of the call and generating an indication thereof. In one embodiment, the CPTD 145 may include energy detection. In another embodiment, the CPTD may include energy detection with guard band elimination. The CPTD 145 may advantageously employ energy detection and energy detection with guard band elimination to allow the detection of human speech, dual-tone-multi-frequency tones, single tones, noise, silence and other information. Call progress tone detection analysis employing energy detection and energy detection with guard band elimination is discussed in more detail with respect to FIGS. 3A and 3B.

In one embodiment, the CPTD 145 may be embodied within at least one of the line interface modules 146, 147, 148, 149. In another embodiment, the CPTD 145 may be embodied within software that is downloaded to at least one of the line interface modules 146, 147, 148, 149. In yet another embodiment, the CPTD 145 may be embodied within software and hardware that includes a digital signal processor. Of course, however, the present invention is not limited to one CPTD 145. Other embodiments of the present invention may have any number of the CPTDs.

The CPTD 145, in one embodiment, is further configured to receive at least one tunable parameter and adjust the call progress tone detection analysis on a call-by-call basis thereof. The tunable parameters may include a "software answer detect time," a "hardware answer detect time," a "ring no answer time," a "minimum call answer time," a "recorded human speech detect time," a "pause wait time after speech detected," and a "maximum resource wait time." The software answer detect time is an amount of time to wait for tone detection. Some type of energy or hardware answer is expected to be detected before the specified time period elapses. The hardware answer detect time is an amount of time to continue tone detection by the CPTD 145 after a hardware answer has been detected.

The ring no answer time is an amount of time that reflects how many ring cycles to detect before declaring a "ring no answer" after detecting the presence of a ring. If speech energy is detected during this interval, the CPTD 145 will abort this timer and begin human speech analysis. In one embodiment, the CPTD 145 will begin human speech versus recorded speech analysis. The minimum call answer time is an amount of time that determines what type of human speech analysis to perform if energy that represents human speech is detected prior to or after the specified time period elapsing. The recorded human speech detect time is an amount of time that represents the amount of a silence interval to detect after detecting energy that represents human speech. In one embodiment, the amount of silence detected may be used to determine if a human answered the phone or if there is recorded human speech, such as an answering machine.

The pause wait time after speech detected is an amount of time between the detection of the first energy that represents human speech and energy that represents a pause occurring after detecting human speech. In one embodiment, the pause wait time after speech detected may be used to determine if the energy detected is speech or recorded speech. The maximum resource wait time is an amount of time the distributed call progress tone detection system 100 will wait for a call progress tone detector, such as CPTD 145, to become available. Of course, however, the present invention is not limited to the above described tunable parameters. In other embodiments, the CPTD 145 may employ additional tunable parameters or any number of tunable parameters.

The switching partition 140 is also couplable to a packet network 130. The packet network 130 may be any type of computer network that employs a packet protocol, such as Internet Protocol ("IP"). The packet network 130 may also be a Local Area Network ("LAN"), a Wide Area Network ("WAN"), an Intranet, an Extranet, an Internet, a private network or a combination thereof.

The CPTD 145, depending upon the call progress tone detection analysis performed, may generate an indication of the progress of a call. In one embodiment, the indications may be a "busy tone," a "reorder tone," a "ring back tone with no answer," a "human speech with answer quickly," a "human speech with pause detected after speech," a "recorded human speech," a "facsimile/modem," a "Telco Intercept" and a "no energy detected before answer detect time expired." These indications advantageously allow the distributed call progress tone detection system 100 to determine the correct processing to be performed on each call. For example, if the CPTD 145 indicated that it detected recorded human speech, the distributed call progress tone detection system 100 may connect an agent to that call. Thus, the agent would be connected to a call where the CPTD 145 detected that a human actually answered the call. Of course, however, the present invention is not limited to the indications listed above. Other embodiments of the present invention may employ other types or additional indications.

The switching partition 140 also includes an input-output distributor ("IOD") 142 that is configured to employ a circuit to interconnect the CPTD 145 and one of the line interface modules 146, 147, 148, 149 to allow the CPTD 145 to perform call progress tone detection analysis with respect to that line interface module. The IOD 142 may also interconnect any of the line interface modules 146, 147, 148, 149 to any other of the line interface modules 146, 147, 148, 149. Additionally, the IOD 142 may interconnect any of the line interface modules 146, 147, 148, 149 with a customer station 190 or an agent station 192 via the packet network 130. In one embodiment, the IOD 142 may employ a Voice Over Internet Protocol ("VoIP") to interconnect one of the line interface modules 146, 147, 148, 149 with the customer station 190 or the agent station 192. In the illustrated embodiment, the customer station 190 may be a computer system capable of communicating with the switching partition 140 via a packet protocol. The agent station 192 may be a computer system capable of communicating with the switching partition 140 via a packet protocol and having software programs that perform specialized functions associated with the distributed call progress tone detection system 100. The agent station 192 may also include a telephone station, any other device or combination of devices that allows an agent (e.g., a person) to communicate with a customer via the distributed call progress tone detection system 100.

In the illustrated embodiment, the circuit that the IOD 142 employs to interconnect is a conventional circuit-switched matrix 144. The circuit-switched matrix 144 is configured to control and selectively interconnect the line interface modules 146, 147, 148, 149 and the CPTD 145. The circuit-switched matrix 144 may selectively interconnect the line interface modules 146, 147, 148, 149 and the CPTD 145 in any manner. In one embodiment, the circuit-switched matrix 144 may be embodied within the IOD 142. Of course, however, the IOD 142 is not limited to using a circuit-switched matrix. In other embodiments, the IOD 142 may employ any type of circuit to interconnect any number of call progress tone detectors and line interface modules.

The distributed call progress tone detection system 100 also may include a main control unit ("MCU") 110 associated with the switching partition 140 and couplable to the packet network 130. The MCU 110 performs call and control processing functions for the distributed call progress tone detection system 100 and may include an MCU database 112. The MCU database 112 may be a flat file system, a relational database, a custom database or a combination thereof and may be used to store call processing information, configurations and specialized programs. In one embodiment, the MCU database 112 may be embodied in a separate device or within the MCU 110.

The MCU 110 is also configured to receive requests from an application over the packet network 130 and transmit call and control processing commands to the switching partition 140. Additionally, the MCU 110 is further configured to create an interconnection between one of the line interface modules 146, 147, 148, 149 and another of the line interface modules, 146, 147, 148, 149 based upon the indication generated by the CPTD 145. The MCU 110 also notifies the application of the interconnection. In one embodiment, the call and control processing commands include a "no answer supervision command," a "use network answer supervision command," a "best try full analysis command," and a "full call process analysis command."

The no answer supervision command causes the MCU 110 to send a command via the packet network 130 to the switching partition 140. The IOD 142 interconnects one of the line interface modules 146, 147, 148, 149 to an available line and controls that particular line interface module to outpulse digits and then connect that line interface module to another line interface module associated with an agent station without answer supervision. "Answer supervision" may include employing the CPTD 145 to perform call progress tone detection analysis, processing and routing (interconnecting) the call based upon the indication generated by the CPTD 145.

The use network answer supervision command causes the MCU 110 to send a command via the packet network 130 to the switching partition 140. The IOD 142 interconnects one of the line interface modules 146, 147, 148, 149 to an available line (or trunk) and controls that particular line interface module to outpulse digits. The IOD 142 then causes the CPTD 145 to be interconnected to that particular line interface module and perform call progress tone detection analysis. Then, based upon the indication generated by the CPTD 145, the MCU 110 sends a command to the IOD 142 to connect that line interface module to another line interface module associated with an agent station. For example, the MCU 110 may send commands to the switching partition 140 to cause the first line interface module 146 to be interconnected with the third line interface module 148.

The best try full analysis command performs the same functions as the use network answer supervision command except that if a call progress tone detector, such as the CPTD 145, is unavailable, the call request is queued for a period of time specified by a tunable parameter. In one embodiment, the tunable parameter is the maximum resource wait time. If the call progress tone detector is unavailable at the expiration of the specified time period, the call command is processed as the no answer supervision command. If the call progress tone detector becomes available during the specified time period, the call is processed just as the use network answer supervision command.

The full call process analysis command performs the same functions as the best try full analysis command except that if the call progress tone detector, such as the CPTD 145, is not available at the expiration of the specified time period, the MCU 110 will abort the call and inform the application that requested the call. Of course, however, the present invention is not limited to the control processing commands described above. Nor is the present invention limited to the methods for processing the call processing commands described above. Other embodiments of the present invention may use different or additional control processing commands and methods for processing the control processing commands.

In one embodiment, the MCU 110 is further configured to notify the application of the indication generated by the CPTD 145. The MCU 110, in another embodiment, is further configured to auto-terminate a call placed on one of the line interface modules 146, 147, 148, 149, if an access node coupled to another of the line interface modules 146, 147, 148, 149 is unavailable. For example, the MCU 110 causes a call to be placed to the customer station 152 via the first line interface module 146. Then, if the MCU 110 determines that there are no agent stations 170, 182, 192 available to take the call, the MCU 110 will automatically terminate the call to the customer station 152. In another embodiment, the MCU 110 employs a timeout period associated with an availability of an access node or access nodes to perform auto-termination. If the timeout period elapses before an access node becomes available, the MCU 110 auto-terminates the call. In a related embodiment, the MCU 110 performs auto-termination based upon the indication generated by the CPTD 145.

Also associated with the distributed call process tone detection system 100 is an application server 120 that is coupled to the packet network 130. The application server 120 may contain the application that communicates with the MCU 110 via the packet network 130. In a related embodiment, the application may be implemented in software executable within the MCU 110. The application may be one selected from a non-predictive dialer, a predictive dialer, an answering machine dialer and a call center. The application server 120 may also include an application database 122 to provide additional application specific functionality. The application database 122 may be a flat file system, a relational database, a custom database or a combination thereof. The application database 122 may be embodied in hardware, software, or in a separate device couplable to the application server 120. Those skilled in the art are familiar with non-predictive dialers, predictive dialers and call center applications. Of course, however, the present invention is not limited to the types of applications described above. Other embodiments of the present invention may use other types of applications and the application server 120 may contain any number of these applications.

The application within the application server 120 may, upon receiving the notification generated by the CPTD 145, transmit information associated with original request sent to the MCU 110 to a terminal coupled to another of the line interface modules 146, 147, 148, 149 associated with the original request. For example, if the customer station 152 is coupled to the agent station 170 via the first line interface module 146 and the third line interface module 148, the application may send information to the terminal 160 via the switching partition 140 and the second line interface module 147. The information may include the customer's name, address and associated sales information. Of course, however, the information sent to a terminal is not limited to the types of information listed above.

Figure 2:
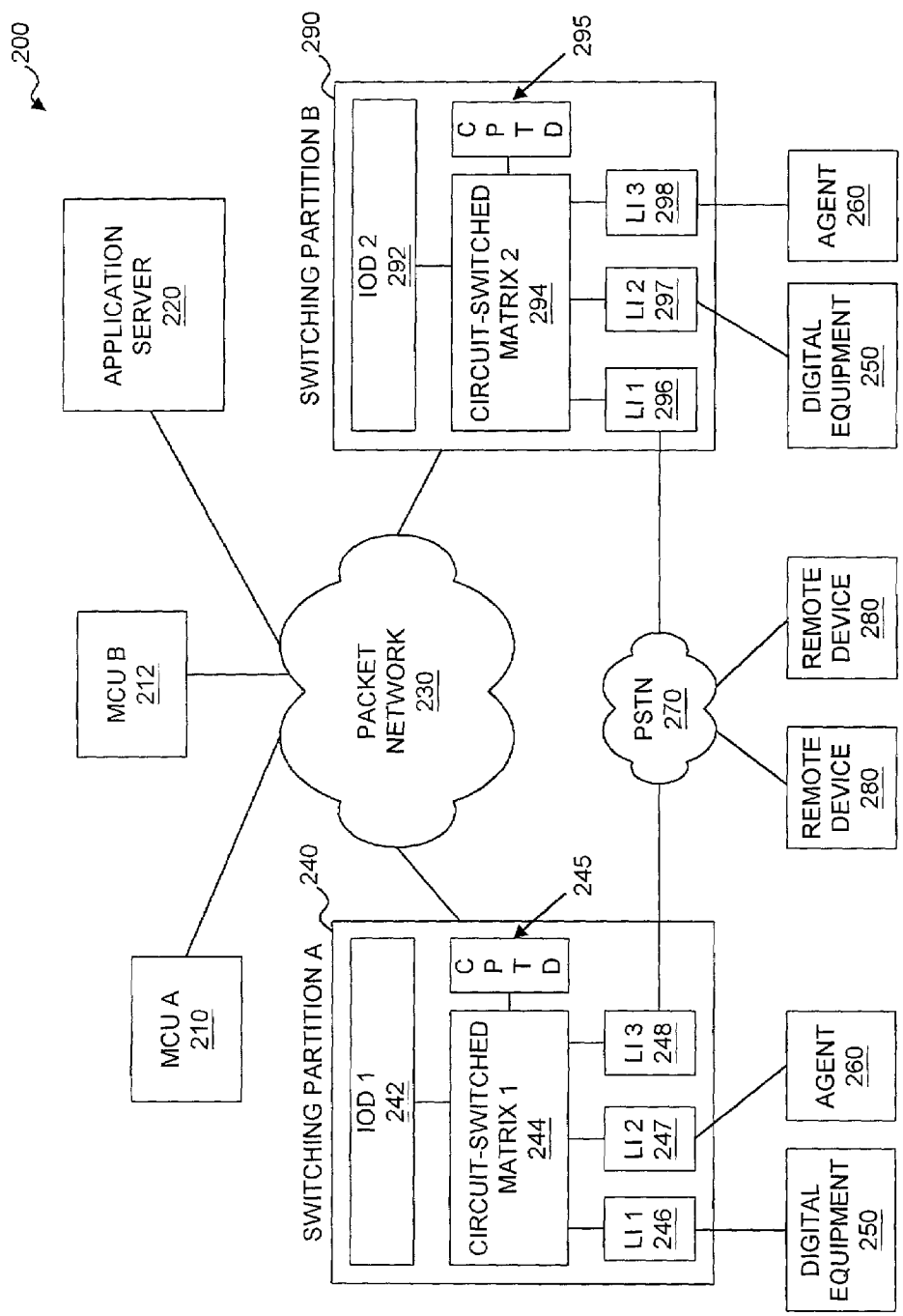
FIG. 2 illustrates a block diagram of an enterprise call center with call progress tone detection constructed in accordance with the principles of the present invention.

Turning now to FIG. 2, illustrated is a block diagram of an enterprise call center with call progress tone detection, generally designated 200, constructed in accordance with the principles of the present invention. The enterprise call center 200 includes a primary main control unit ("MCU A") 210, a secondary main control unit ("MCU B") 212, a switching partition A 240 and a switching partition B 290, all of which are coupled to a packet network 230. MCU A 210 and MCU B 212 are configured to process application requests, and perform call and control processing functions similar to the MCU 110 of FIG. 1. MCU A 210 and MCU B 212 cooperate to form a redundant pair, thus providing the enterprise call center 200 with disaster tolerance when either MCU A 210 or MCU B 212 fails.

In the illustrated embodiment, the packet network 230 may be a LAN, a WAN, a packet-switched network or a combination thereof. The packet network 230 may employ a Transport Control Protocol/Internet Protocol (TCP/IP), custom communication protocol, other network protocols or a combination thereof. The packet network 230, in one embodiment, also advantageously provides the functions of both a communications link and an inter-processor link between MCU A 210 and MCU B 212, which had previously been implemented with two separate physical links. Thus, the packet network 230 allows MCU A 210 and MCU B 212 to be geographically located anywhere.

In the illustrated embodiment, both the switching partition A 240 and the switching partition B 290 include IODs 242, 292, circuit-switched matrixes 244, 294, CPTDs 245, 295, and line interface modules 246, 247, 248, 296, 297, 298, respectively. The switching partition A 240 and the switching partition B 290, and their associated devices, operate and have the same functionality as the switching partition 140 of FIG. 1. The line interface modules 246, 297 are coupled to access nodes that are digital equipment 250. The digital equipment 250 may be any device, such as a computer terminal, that is capable of displaying information and performing operator entry functions. In another embodiment, the digital equipment 250 may be a conventional computer system that is configured to execute specific applications associated with a call center.

The line interface modules 247, 298 are coupled to access nodes that are agent stations 260. The agent stations 260 may be a telephone station or any other device or combination of devices that allows an agent (e.g., a person) to communicate with a customer via the enterprise call center 200. The line interface modules 248, 296 are coupled to access nodes via a PSTN 270 that are remote devices 280. The remote devices 280 may be a plain old telephone station (POTS), a computer system or any device associated configured to communicate with the enterprise call center 200 via the PSTN 270. Typically, the remote devices 280 are associated with a customer.

The enterprise call center 200, in the illustrated embodiment, includes an application server 220 that is configured to execute an application. The application server 220 may be a conventional computer server or may be embodied within the MCU A 210, MCU B 212 or a combination thereof. The application may be selected from a non-predictive dialer, a predictive dialer, an answering machine dialer and a call center. Of course, however, the present invention is not limited to the types of applications listed above. In other embodiments, the present invention may use any type of application and the application server 220 may contain any number of applications.

In the illustrated embodiment, the enterprise call center 200 may operate by an application associated with the application server 220 initiating a call request to MCU A 210. In this example, MCU A 210 is acting as the primary MCU and MCU B is acting as the secondary or backup MCU. MCU A 210 receives the call request and sends setup and call commands to the switching partition A 240. MCU A 210 may select the switching partition A 240 or the switching partition B 290 based on available line interface modules, available CPTDs, or based upon the loading of the switching partitions 240, 290. MCU A 210, in other embodiment, may select between the switching partitions 240, 290 based upon the location of the switching partition in relation to the remote device 280 (or customer), the digital equipment 250 or the agent stations 260.

In one example, the switching partition A 240 employs the IOD 242, the circuit switched matrix 244, the CPTD 245 and the line interface module 248 to call one of the remote devices 280 via the PSTN 270. Once the remote device 280, or a customer using the remote device 280, answers the call, the switching partition A 240 employs the CPTD 245 to perform call progress tone detection. In this case, the CPTD 245 is detecting when a human has answered the call. Once the CPTD 245 detects a human voice, the switching partition A 240 and the CPTD 245 send an indication to MCU A 210. MCU A 210 then finds an available agent station 260 and creates an interconnection between the remote device 280 and the agent station 260. In this example, the MCU A 210 interconnects the remote device 280 via the third line interface module 248 of the switching partition A 240, the packet network 230 and the third line interface module 298 of the switching partition B 290.

The MCU A 210 also notifies the application associated with the application server 220 of the interconnection. The application may send information associated with the remote device 280 called to the digital equipment 250 coupled to the switching partition B's second line interface module 297 via MCU A 210. See FIG. 1 for a description of the type of commands employed in this process and the types of information that may be sent to access nodes such as the digital equipment 250.

The enterprise call center 200 advantageously employs the packet network 230 to allow its constituent devices to communicate via the packet network 230, regardless of a location of a particular device. The primary and secondary MCUs (MCU A 210, MCU B 212) and the first and second switching partitions 240, 290 may thus be placed in geographically separate locations, while retaining the functionality of an integrated call center.

Turning now to FIG. 3A, illustrated is an example of a signal, generally designated 300, employable with a CPTD having energy detection in accordance with the principles of the present invention. The signal 300 contains sampled data points of peak-to-average ratios of a normalized sound signal detected by a CPTD, such as the CPTD 145 of FIG. 1. In the illustrated example, the signal 300 includes silence, noise, speech and tones, such as dual tones and single tones. Of course, however, the present invention is not limited to the types of signals listed above. In other embodiments, the present invention may detect additional or different types of signals and in any order or combination.

Some of the previous signal detection devices employed energy detection with guard bands to determine the type of signal, such as silence, noise, speech and tones. Energy detection with guard bands is discussed in U.S. Pat. No. 4,696,031, entitled "Signal Detection and Discrimination Using Waveform Peak Factor," to Richard L. Freudberg, et al. and is herein incorporated by reference. The guard bands 302, 304, 306, 308 are regions where energy detection is not performed. The previous signal detection devices were mainly concerned with signals that were clearly within a given signal type range. This resulted in a delay in detecting the type of signal. For example, when the signal 300 is in the noise range and transitions to the speech range, previous signal detection devices would not detect any signals within the second guard band 304. This resulted in a delay before speech is detected and an additional delay before any processing based on detecting speech would begin.

Turning now to FIG. 3B with continuing reference to FIG. 3A, illustrated is an example of a signal, generally designated 310, employable with a CPTD having energy detection with guard band elimination constructed in accordance with the principles of the present invention. In FIG. 3B, the signal 310 is analogous to the signal 300 of FIG. 3A and contains sampled data points of peak-to-average ratios of a normalized sound signal detected by the CPTD.

FIG. 3B also illustrates the transition points 312, 314, 316, 318 where the signal 310 transitions from one type of signal to another type of signal. Since the guard bands 302, 304, 306, 308 are eliminated, the CPTD can detect the type of signal up to and past the transition points 312, 314, 314, 316, 318. This decreases the amount of time required by the CPTD to detect whether the signal 310 is silence, noise, speech or tones. One skilled in the pertinent art might think that detecting a signal type at one of the transition points 312, 314, 316, 318 might be prone to error. However, the CPTD has proven to be more accurate and faster with the elimination of the guard bands 302, 304, 306, 308. One reason the CPTD is more accurate is due to the CPTD analyzing more samples at or near the transition points. The use of the guard bands 302, 304, 306, 308 actually prevented the previous signal detection devices from sampling at or near the transition points 312, 314, 316, 318. Thus, the previous signal detection devices merely analyzed samples that were clearly within a given signal type range.

Figure 4:
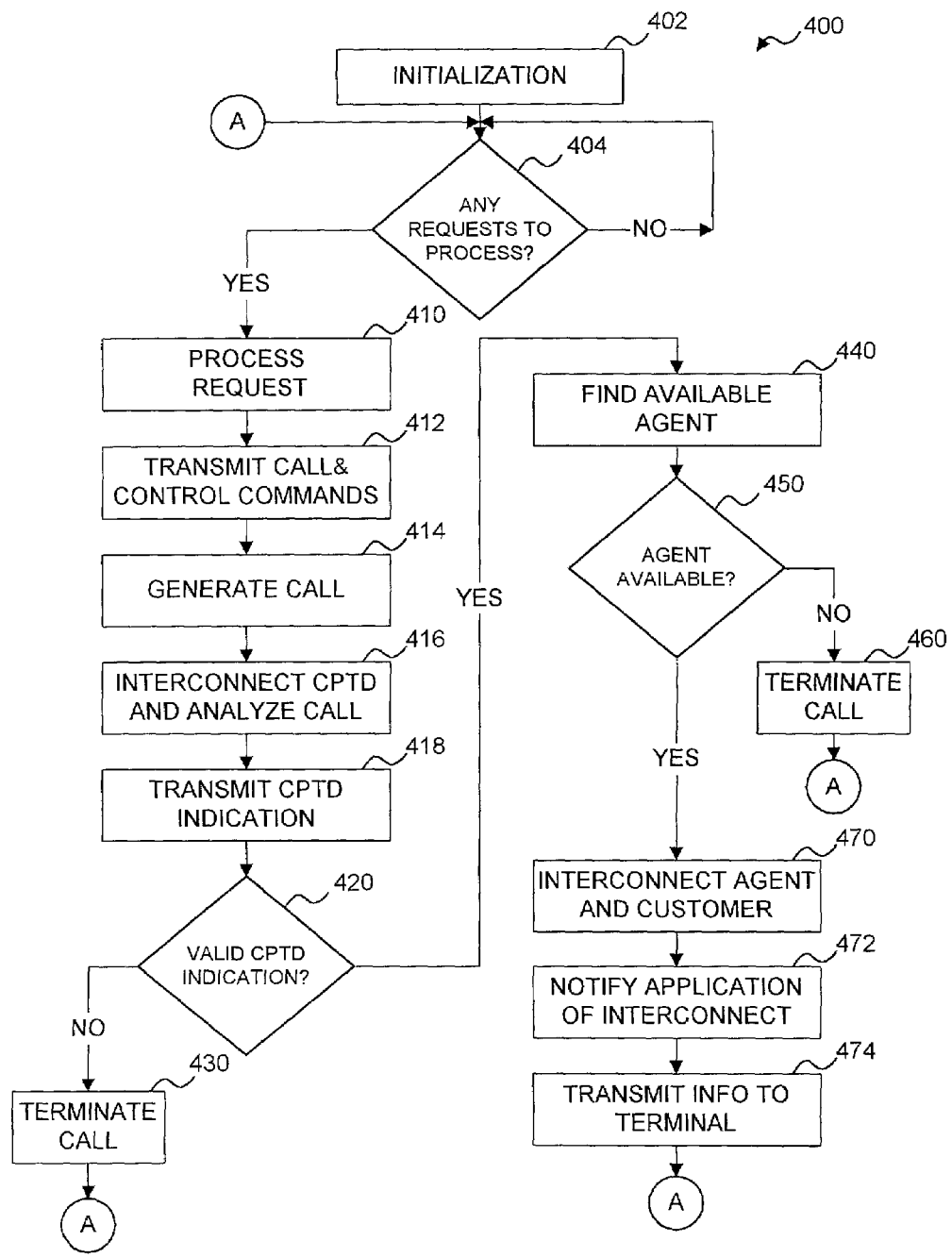
FIG. 4 illustrates a flow diagram of an embodiment of a method of operating a distributed call progress tone detection system constructed in accordance with the principles of the present invention.

Turning now to FIG. 4, illustrated is a flow diagram of an embodiment of a method, generally designated 400, of operating a distributed call progress tone detection system constructed in accordance with the principles of the present invention. In FIG. 4, the distributed call progress tone detection system first performs initialization in a step 402.

Figure 5:
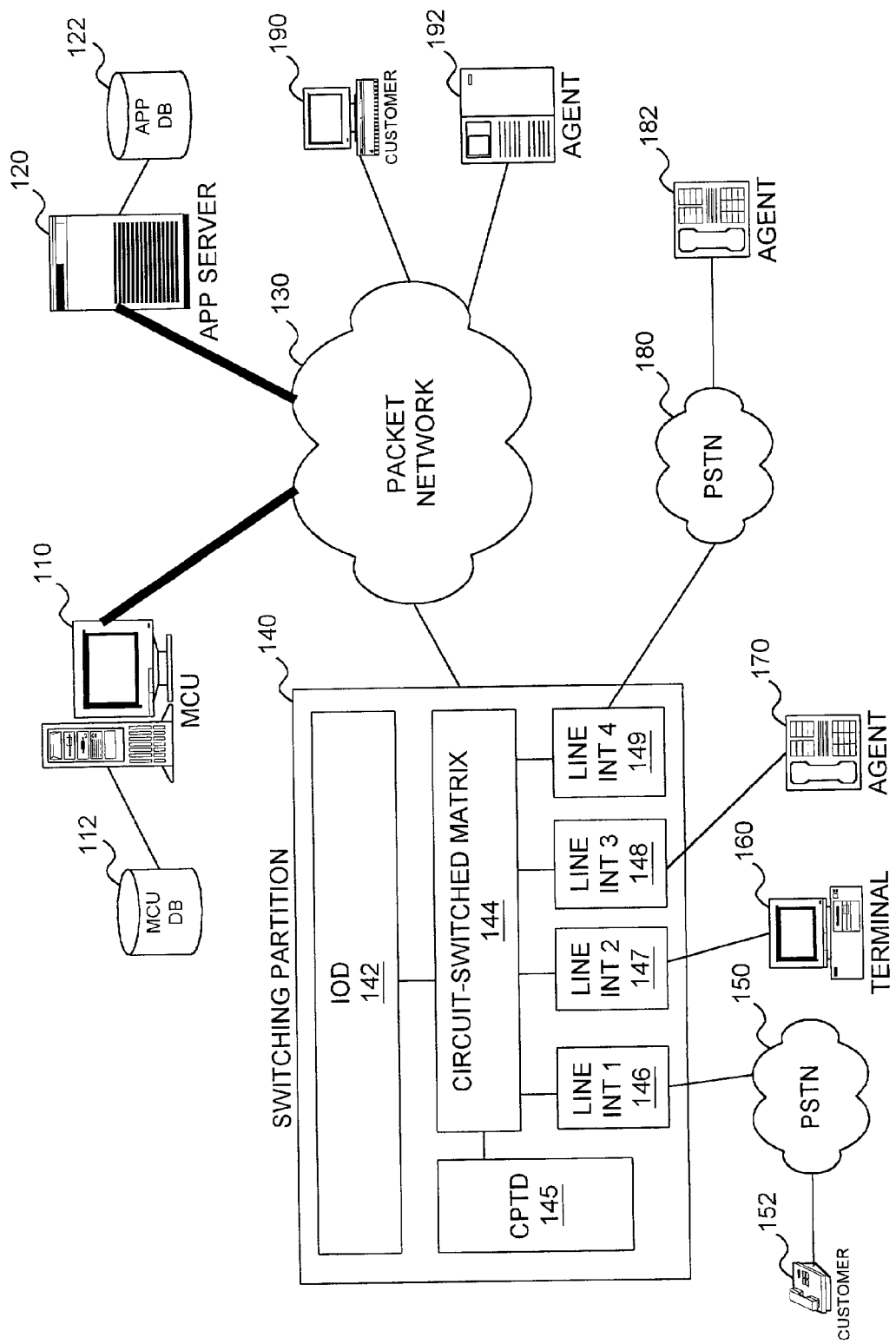
FIGS. 5–12 illustrate block diagrams of a distributed call progress tone detection system with highlighted flow connections corresponding to the method of FIG. 4 constructed in accordance with the principles of the present invention.

After initialization, a MCU of the distributed call progress tone detection system determines if there is a request from an application to process in a decisional step 404. The request, in one embodiment, may be a call initiation request sent from an application associated with an application server to a MCU via a packet network. FIG. 5 illustrates, using highlighted flow connections, a request being sent from the application server 120 to the MCU 110 via the packet network 130.

Figure 6:
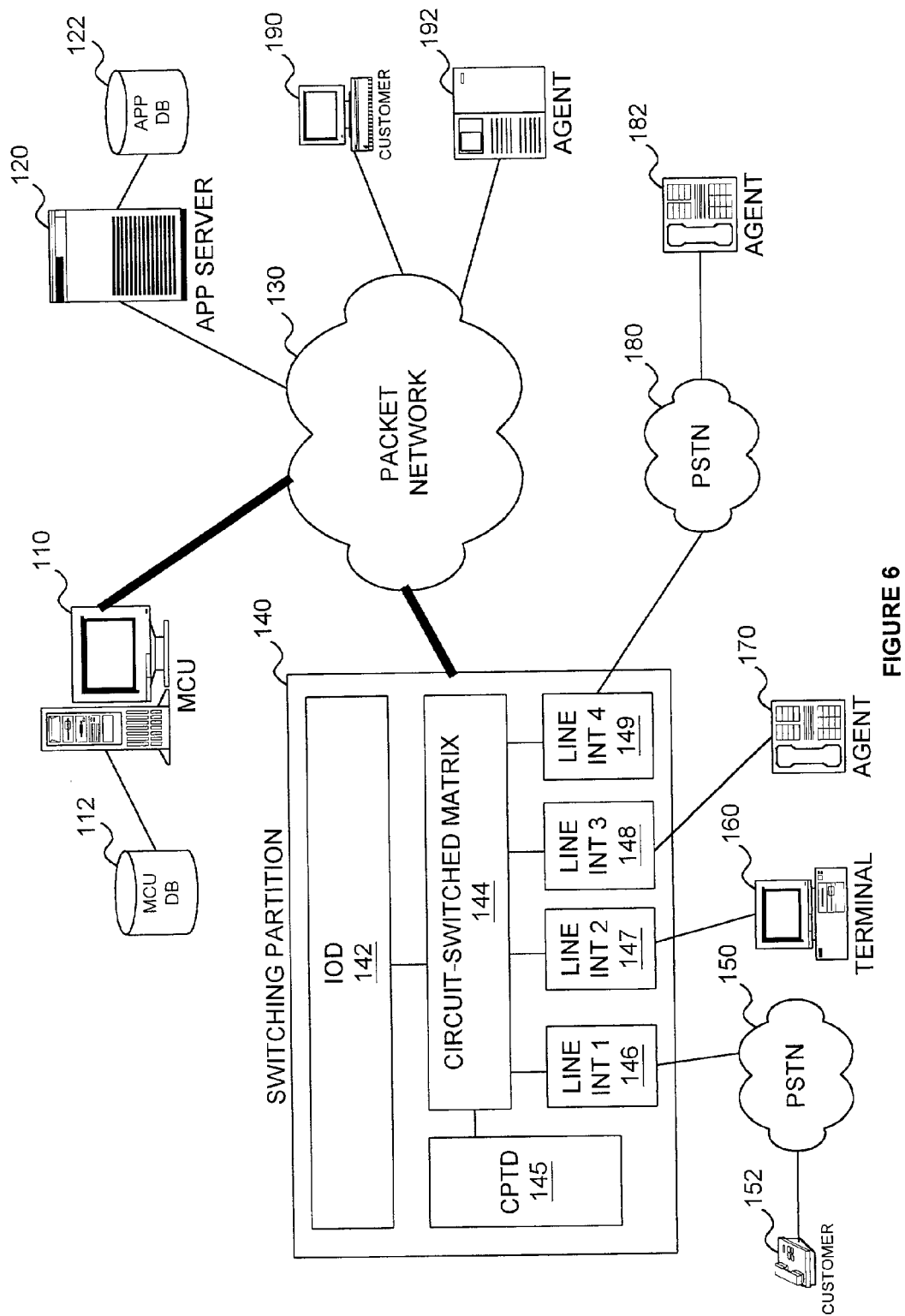

If there is no request to process, the MCU returns to determine if there is another request to process in the decisional step 404. If there is a request to process, the MCU processes the request in a step 410. The MCU then transmits a transmit call and control processing commands to a switching partition of the distributed call progress tone detection system in a step 412. FIG. 6 illustrates, using highlighted flow connections, the MCU 110 transmitting commands to the switching partition 140 via the packet network 130.

Figure 7:
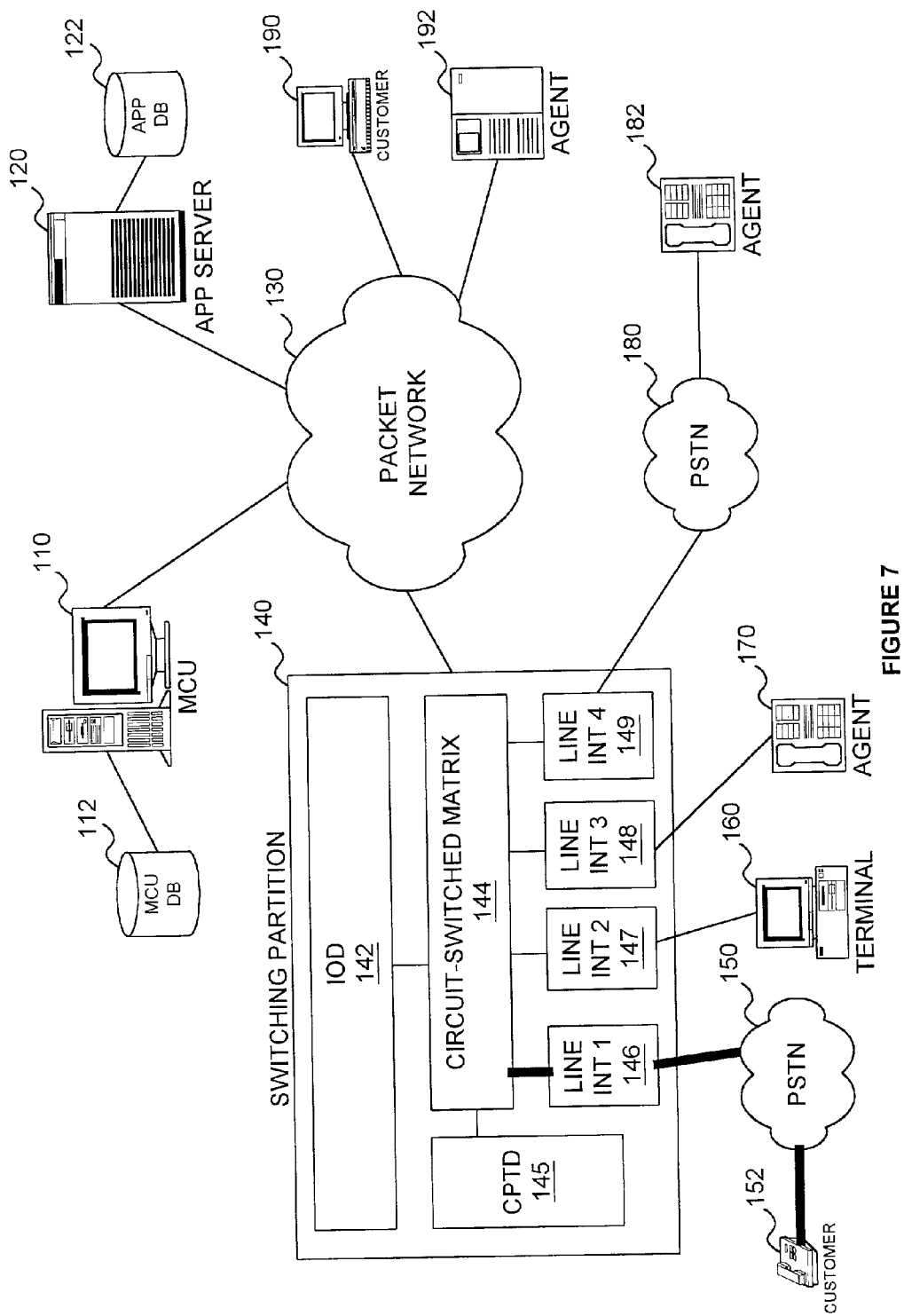

Next, the switching partition generates a call in a step 414. In one embodiment, the switching partition employs an IOD to generate a call to a customer on one of the switching partition's line interface modules. In a related embodiment, the switching partition also employs a circuit-switched matrix to select a line interface module. FIG. 7 illustrates, using highlighted flow connections, a call to the customer station 152 via the PSTN 150, the first line interface module 146 and the circuit-switched matrix 144.

Figure 8:
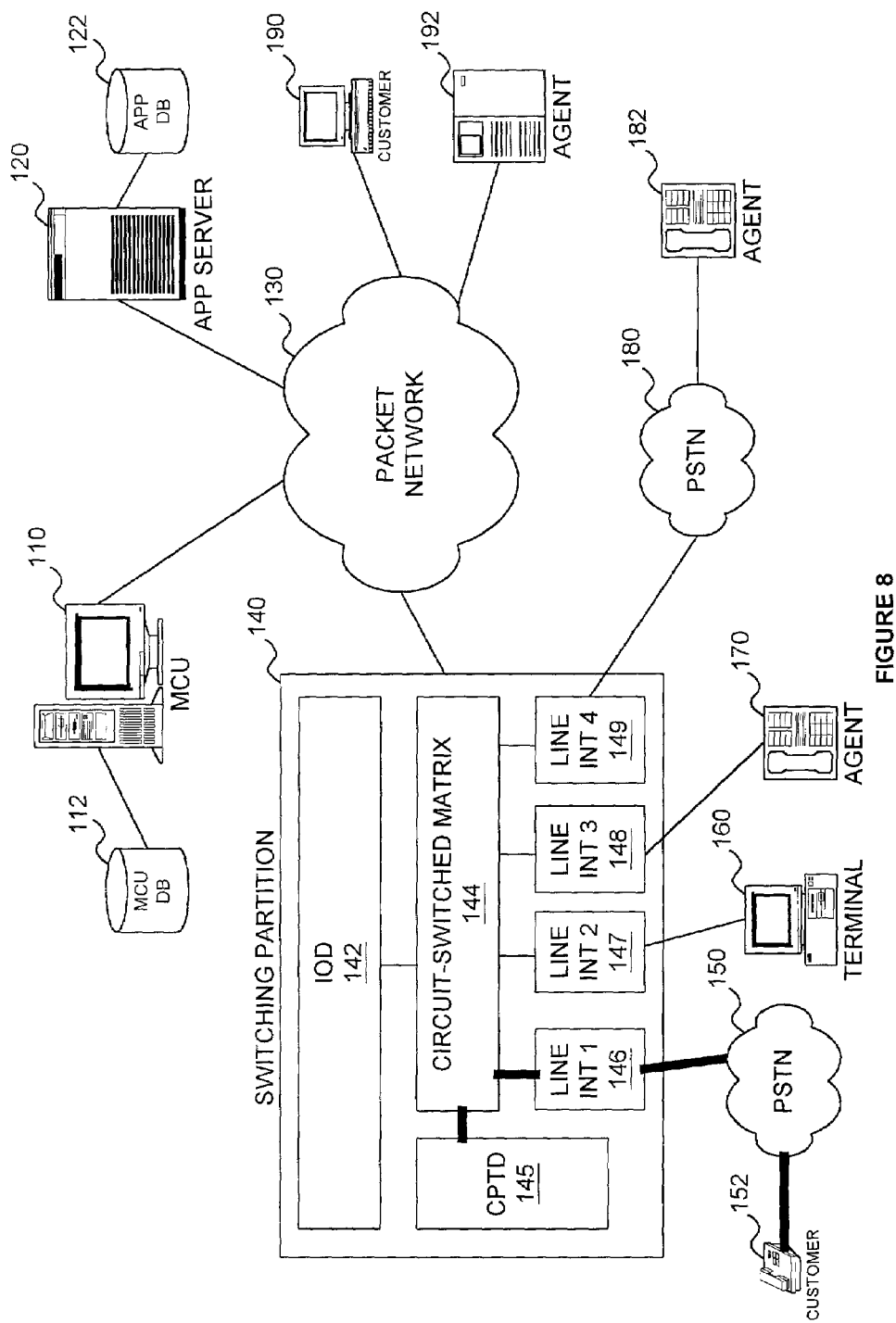

Once the call is generated, the IOD interconnects a CPTD to the call and analyzes the call in a step 416. In one embodiment, the IOD may employ the circuit-switched matrix to interconnect the CPTD to the call on the line interface module. FIG. 8 illustrates, using highlighted flow connections, the interconnection between the CPTD 145, the circuit-switched matrix 144 and the first line interface module 146 to allow the CPTD 145 to perform call progress tone detection analysis.

Figure 9:
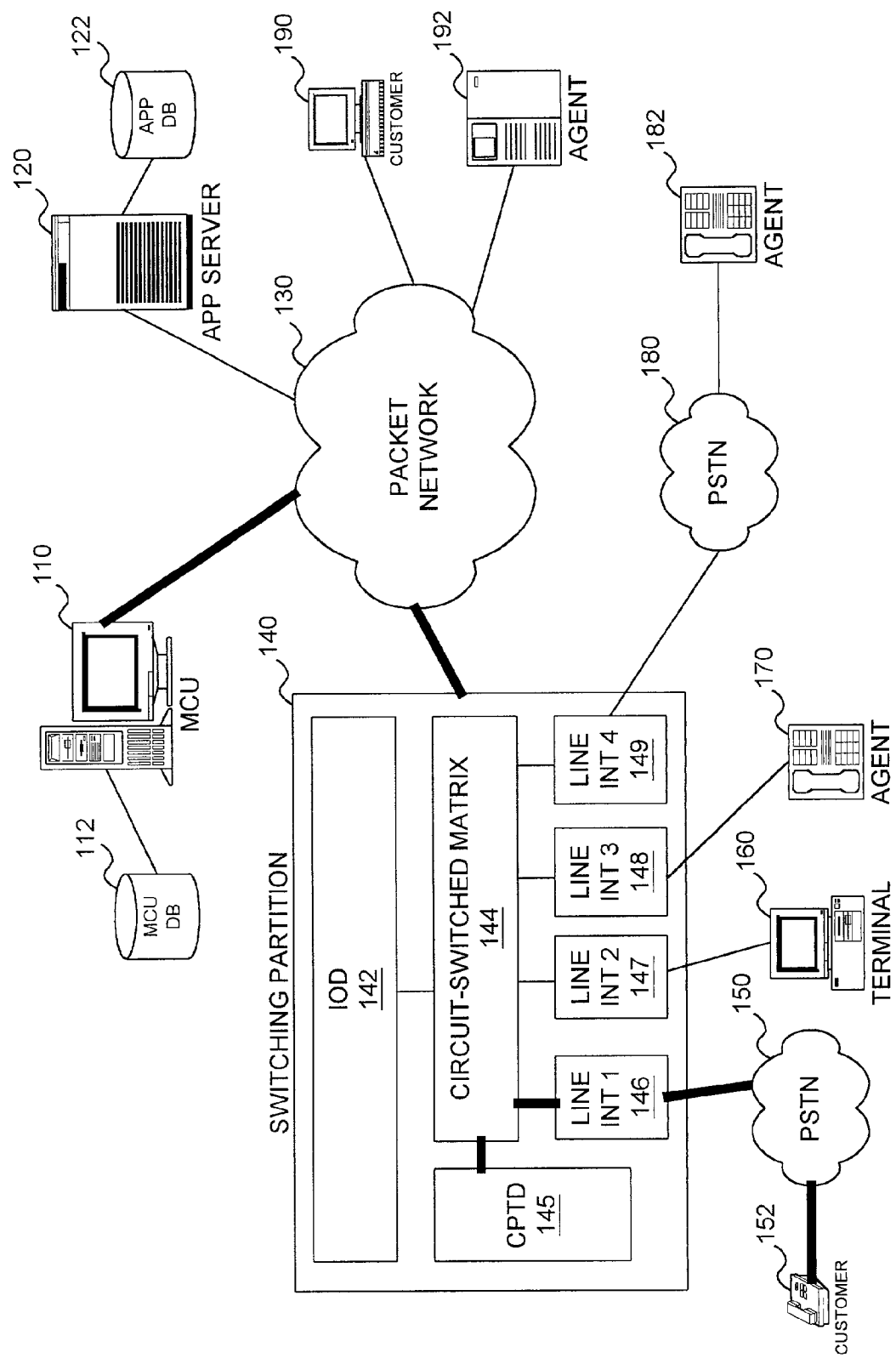

Then, the CPTD performs call progress tone detection analysis on the call and generates an indication thereof. The CPTD, in one embodiment, may perform the call progress tone detection analysis employing energy detection. In a related embodiment, the CPTD may perform the call progress tone detection analysis employing energy detection with guard band elimination. The switching partition then transmits the generated CPTD indication to the MCU in a step 418. FIG. 9 illustrates, using highlighted flow connections, the switching partition 140 transmitting the CPTD indication to the MCU 110 via the packet network 130.

The MCU then determines if the CPTD indication is valid in a decisional step 420. For example, the MCU may require that a human answered the phone instead of an answering machine in order for the CPTD indication to be valid. The type of CPTD indication required for validity depends upon the type of request made by the application. See FIG. 1 for a description of the type of commands the MCU processes and the call progress tone detection indications. If the CPTD indication is not valid, the MCU terminates the call in a step 430. The MCU then returns to determine if there is another request to process in the decisional step 404.

If the CPTD indication is valid, the MCU then finds an available agent stations in a step 440. The MCU may use an agent station that is directly coupled to one of the line interface modules of the switching partition or another switching partition coupled to the packet network, an agent station that is coupled to a switching partition via a PSTN connection, or to an agent station that is coupled to the packet network. Of course, however, the present invention is not limited to the examples described above. In other embodiments, the present invention may use an agent station that is capable of being coupleable to the distributed call progress tone detection system in any manner including wireless connections.

Figure 10:
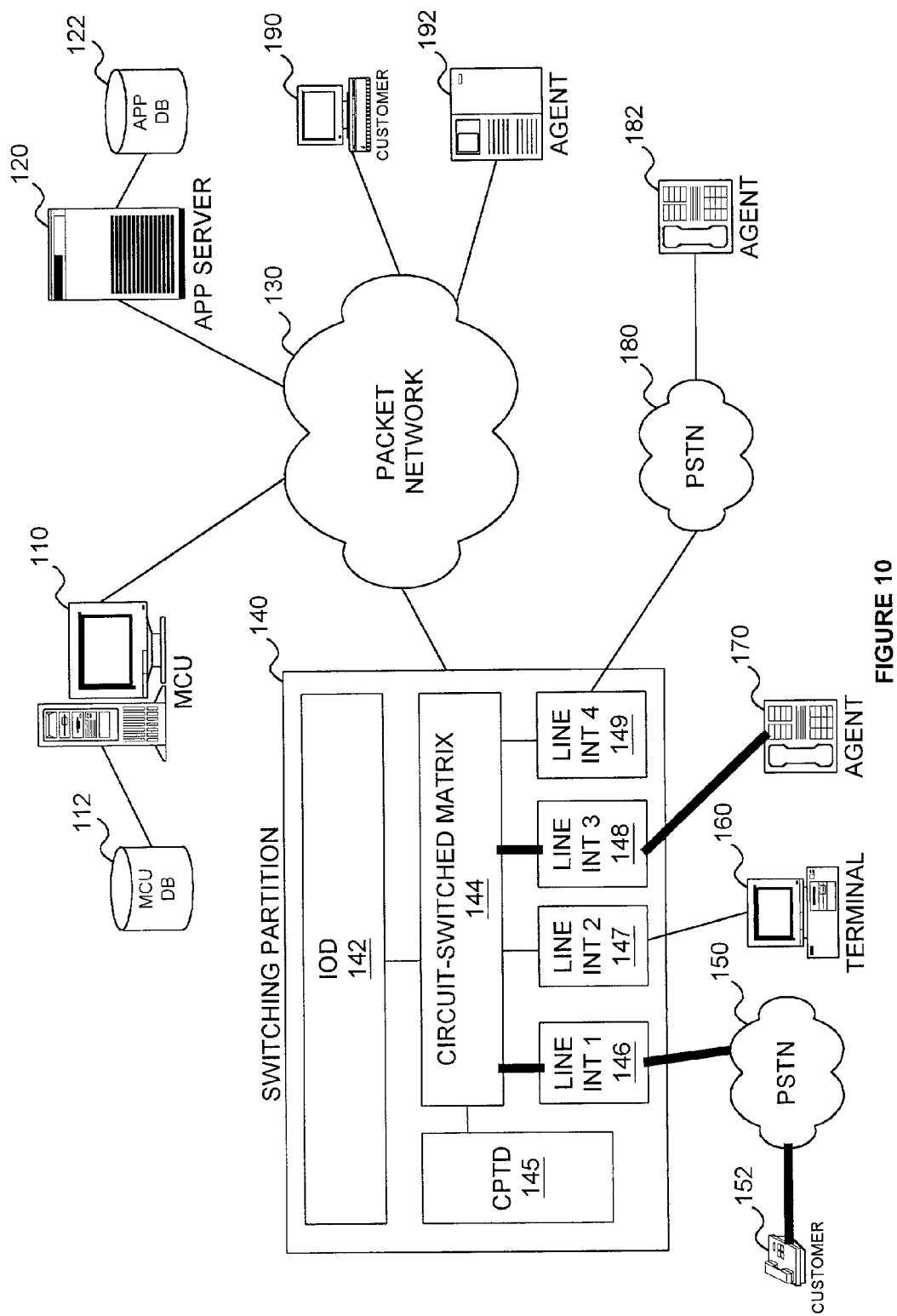

Then, the MCU determines if an agent station is available in a decisional step 450. If there are no agent stations available, the MCU terminates the call in a step 460. The MCU then returns to determine if there is another request to process in the decisional step 404. If an agent station is available, the MCU sends one or more commands to the switching partition to interconnect the agent station with the call on the line interface module in a step 470. FIG. 10 illustrates, using highlighted flow connections, the interconnection of the customer station 152 coupled to the first line interface module 146 and the agent station 170 coupled to the third line interface module 148. In another embodiment and with reference to FIG. 10, the MCU 110 may cause the first line interface module 146 to be interconnected to the agent station 192 via the packet network 130 employing a VoIP. The agent stations that may be connected to the customer stations, may be specified by the application or specified in a configuration database, such as the MCU database 112.

Figure 11:
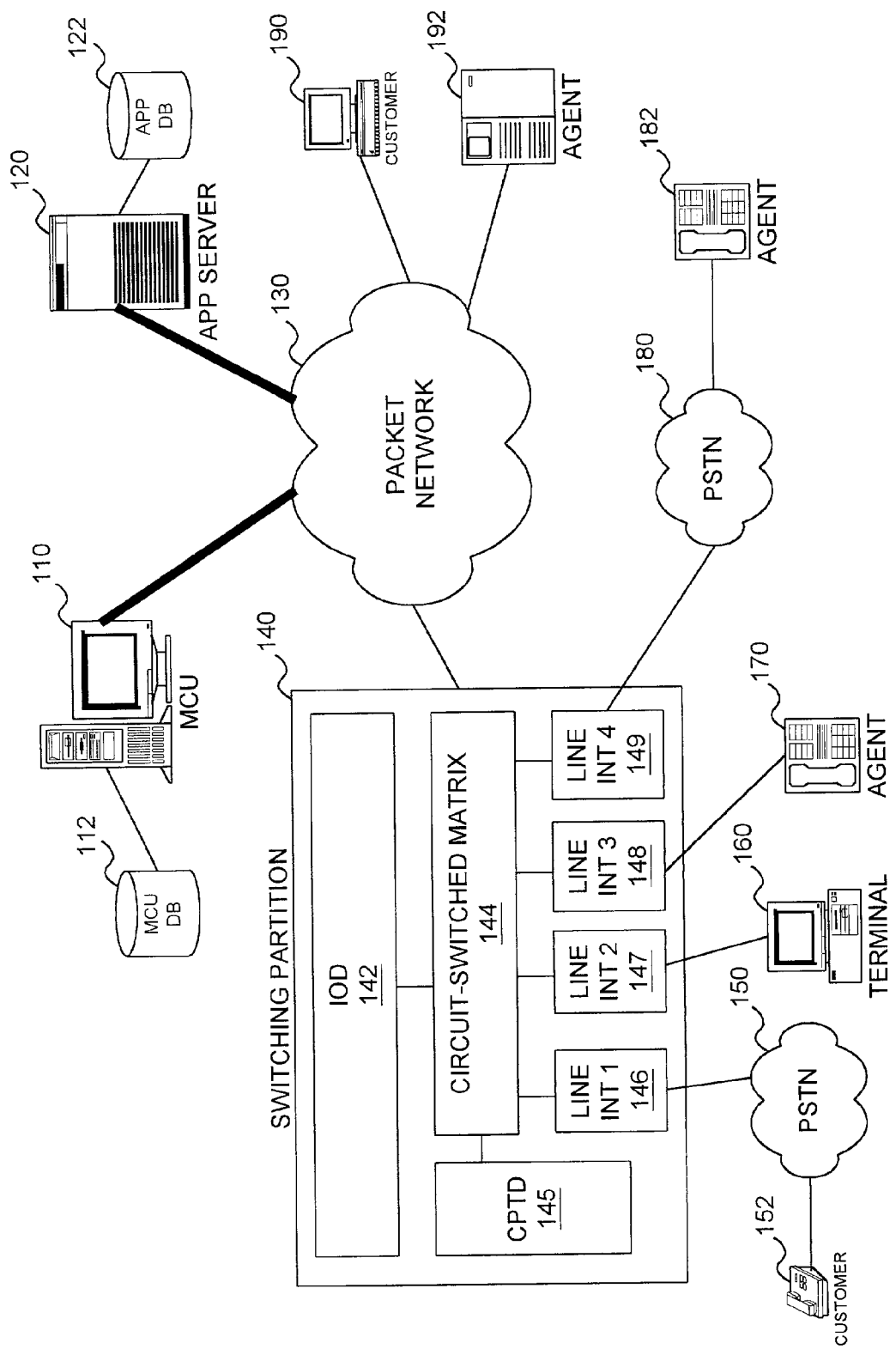

Next, the MCU notifies the application of the interconnection in a step 472. In a related embodiment, the MCU may notify the application of the interconnect at the same time the MCU is interconnecting the call to an agent station. FIG. 11 illustrates, using highlighted flow connections, the MCU 110 notifying the application associate with the application server 120 via the packet network 130.

Figure 12:
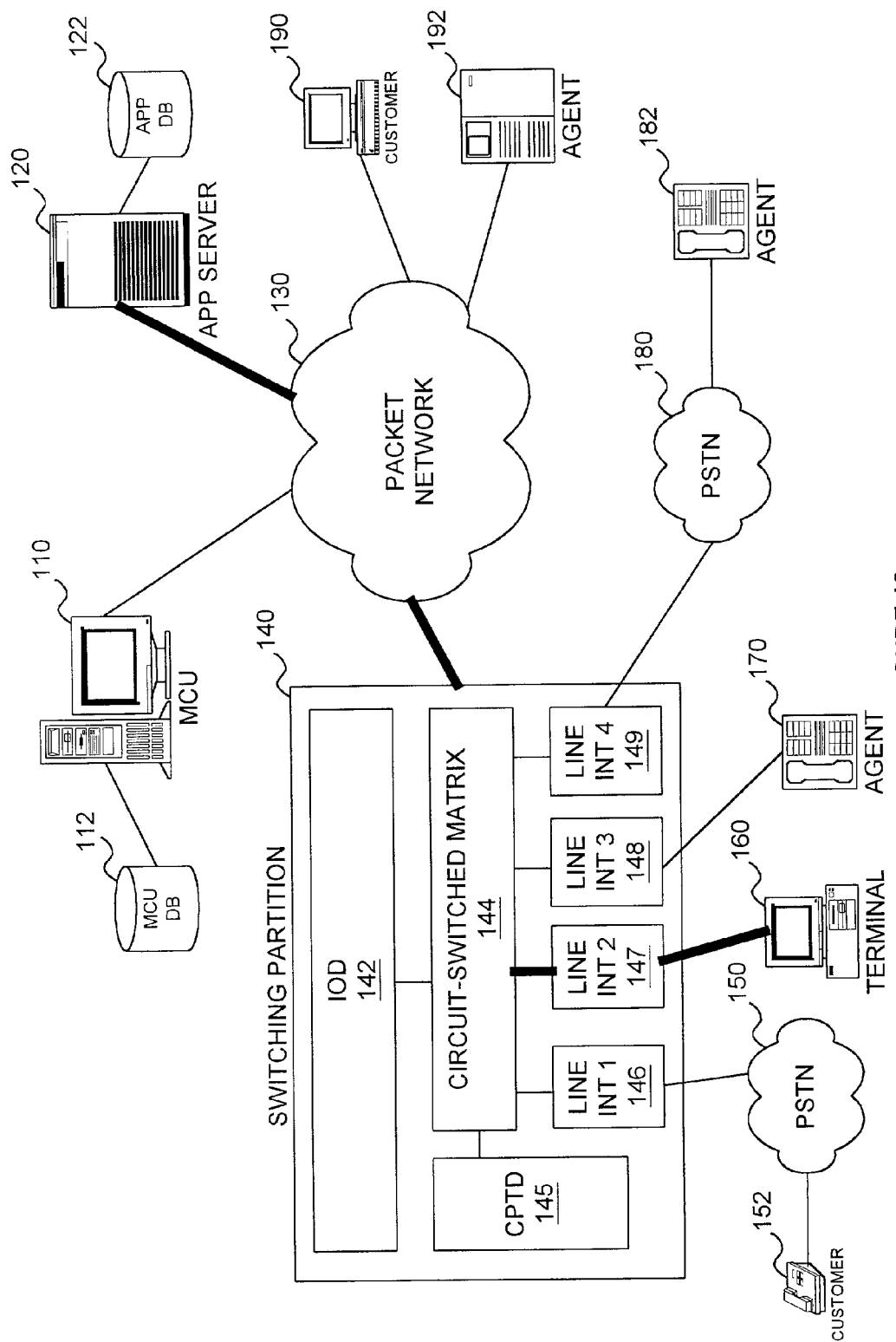

Once the application is notified of the interconnection, the application may send information to a terminal in a step 474. For example, the information may be related to the call, the customer, the seller, product information or a combination thereof. FIG. 12 illustrates, using highlighted flow connections, the application associated with the application server 120 sending information to the terminal 160 associated with the agent station 170 via the packet network 130, the switching partition 140 and the second line interface module 147. In another embodiment, the application may send the information to the MCU and the MCU then sends the information to a terminal associated with the interconnected agent station. The MCU then returns to determine if there is another request to process in the decisional step 404.

One skilled in the pertinent art should know that the present invention is not limited to processing one request at a time. The present invention may process multiple requests at the same time each of which may be in different stages of processing or completion. Nor is the present invention limited to processing the requests described above. Other embodiments of the present invention may process additional types of requests and may have additional or fewer steps than described above.

Turning now to FIG. 5, illustrated is a block diagram of a distributed call progress tone detection system (such as the distributed call progress tone detection 100 of FIG. 1) with highlighted flow connections corresponding to the method of FIG. 4 constructed in accordance with the principles of the present invention. In FIG. 5, highlighted are the flow connections between the application server 120 and the MCU 110. An application associated with the application server 120 sends a call processing request to the MCU 110 via the packet network 130. The call processing request may include a request to call the customer station 152 via the PSTN 150. In another embodiment, the call processing request could also include a call to the customer station 190 via the packet network 130. Of course, however, the present invention is not limited to processing a call processing request from the application server 120. In other embodiments, the customer station 152, terminal 160 or the agent station 170 may initiate requests to retrieve information from the application server 120 or the application database 122 via the application server 120.

Turning now to FIG. 6, illustrated is a block diagram of a distributed call progress tone detection system (such as the distributed call progress tone detection 100 of FIG. 1) with highlighted flow connections corresponding to the method of FIG. 4 constructed in accordance with the principles of the present invention. In FIG. 6, highlighted are the flow connections between the MCU 110 and the switching partition 140. The MCU 110 transmits call and control processing commands to the switching partition 140 via the packet network 130. Of course, however, the present invention is not limited to transmitting only call and control processing commands to the switching partition 140. In other embodiments, the MCU may send additional or different commands to the switching partition 140.

Turning now to FIG. 7, illustrated is a block diagram of a distributed call progress tone detection system (such as the distributed call progress tone detection 100 of FIG. 1) with highlighted flow connections corresponding to the method of FIG. 4 constructed in accordance with the principles of the present invention. In FIG. 7, highlighted are the flow connections between the circuit switched matrix 144, the first line interface 146 and the customer station 152. The switching partition 140, employing the IOD 142, made a call to the customer station 152 via the PSTN 150 on the first line interface module 146.

Turning now to FIG. 8, illustrated is a block diagram of a distributed call progress tone detection system (such as the distributed call progress tone detection 100 of FIG. 1) with highlighted flow connections corresponding to the method of FIG. 4 constructed in accordance with the principles of the present invention. In FIG. 8, highlighted are the flow connections that represent the interconnection between the CPTD 145, the circuit-switched matrix 144 and the first line interface module 146. The interconnection between the CPTD 145 and the first line interface module 146 allows the CPTD 145 to perform call progress tone detection analysis on the call made to the customer station 152.

Turning now to FIG. 9, illustrated is a block diagram of a distributed call progress tone detection system (such as the distributed call progress tone detection 100 of FIG. 1) with highlighted flow connections corresponding to the method of FIG. 4 constructed in accordance with the principles of the present invention. In FIG. 9, highlighted are the flow connections between the switching partition 140 and the MCU 110. Once the CPTD 145 performed the call progress tone detection analysis and generated an indication, the switching partition 140 transmits the indication to the MCU 110 via the packet network 130.

Turning now to FIG. 10, illustrated is a block diagram of a distributed call progress tone detection system (such as the distributed call progress tone detection 100 of FIG. 1) with highlighted flow connections corresponding to the method of FIG. 4 constructed in accordance with the principles of the present invention. In FIG. 10, highlighted are the flow connections that represent the interconnection of the customer station 152 coupled to the first line interface module 146 and the agent station 170 coupled to the third line interface module 148. The MCU 110 sent call and control processing commands to the switching partition 140 to interconnect the customer station 152 and the agent station 170 to allow the customer station 152 and the agent station 170 to communicate with each other. Of course, however, the present invention is not limited to the type of interconnection described above. In other embodiments, the present invention may interconnect multiple access nodes together that are located within the same or different switching partitions or to access nodes coupled to the packet network 130.

Turning now to FIG. 11, illustrated is a block diagram of a distributed call progress tone detection system (such as the distributed call progress tone detection 100 of FIG. 1) with highlighted flow connections corresponding to the method of FIG. 4 constructed in accordance with the principles of the present invention. In FIG. 11, highlighted are the flow connections between the MCU 110 and the application server 120. The MCU 110 notifies the application associate with the application server 120 of the interconnection between the customer station 152 and the agent station 170 via the packet network 130. In a related embodiment, the MCU 110 may also notify the application associated with the application server 120 of the indication generated by the CPTD 145.

Turning now to FIG. 12, illustrated is a block diagram of a distributed call progress tone detection system (such as the distributed call progress tone detection 100 of FIG. 1) with highlighted flow connections corresponding to the method of FIG. 4 constructed in accordance with the principles of the present invention. In FIG. 12, highlighted are the flow connections between the application server 120 and the terminal 160, via the switching partition 140 and the second line interface 147. The application associated with the application server 120 sends information to the terminal 160 via packet network 130, the switching partition 140 and the second line interface module 147. The information may be customer information associated with the customer station 152 to allow an agent at the agent station 170 to be informed of the customer on the line. Of course, however, other or additional information may be sent to the terminal 160 to assist the agent at the agent station 170.

Although the present invention has been described in detail, those skilled in the art should understand that they can make various changes, substitutions and alterations herein without departing from the spirit and scope of the invention in its broadest form.

What is claimed is:

1. A distributed call progress tone detection system couplable to a packet network, comprising:
   a switching partition couplable to said packet network and including:
      line interface modules configured to provide an interface to corresponding access nodes,
      a call progress tone detector configured to perform call progress tone detection analysis and generate an indication thereof, and
      an input-output distributor configured to employ a circuit to interconnect said call progress tone detector and a first of said line interface modules to allow said call progress tone detector to perform said call progress tone detection analysis with respect to said first of said line interface modules; and
   a main control unit configured to receive requests from an application over said packet network, transmit call and control processing commands to said switching partition, create an interconnection between said first of said line interface modules and a second of said line interface modules based on said indication and notify said application of said interconnection.

2. The distributed call progress tone detection system as recited in claim 1 wherein said call progress tone detector includes energy detection.

3. The distributed call progress tone detection system as recited in claim 1 wherein said call progress tone detector includes energy detection with guard band elimination.

4. The distributed call progress tone detection system as recited in claim 1 wherein said call progress tone detector is further configured to receive at least one tunable parameter and adjust said call progress tone detection analysis on a call-by-call basis thereof.

5. The distributed call progress tone detection system as recited in claim 4 wherein said at least one tunable parameter is selected from the group consisting of:
   a software answer detect time,
   a hardware answer detect time,
   a ring no answer time,
   a minimum call answer time,
   a recorded human speech detect time,
   a maximum resource wait time, and
   a pause wait time after speech detected.

6. The distributed call progress tone detection system as recited in claim 1 wherein said indication is selected from the group consisting of:
   a busy tone,
   a reorder tone,
   a ring back tone with no answer,
   a human speech with answer quickly,
   a human speech with pause detected after speech,
   a recorded human speech,
   a facsimile/modem,
   a Telco Intercept, and
   a no energy detected before answer detect time expired.

7. The distributed call progress tone detection system as recited in claim 1 wherein said line interface modules are dynamically configurable via program downloads.

8. The distributed call progress tone detection system as recited in claim 1 wherein said call progress tone detector may be embodied within at least one of said line interface modules.

9. The distributed call progress tone detection system as recited in claim 1 wherein said call progress tone detector may be embodied within software downloaded to at least one of said line interface modules.

10. The distributed call progress tone detection system as recited in claim 1 wherein said main control unit further notifies said application of said indication.

11. The distributed call progress tone detection system as recited in claim 1 wherein said call and control processing commands are selected from the group consisting of:

a no answer supervision command,
a use network answer supervision command,
a best try full analysis command, and
a full call progress analysis command.

12. The distributed call progress tone detection system as recited in claim 1 wherein said main control unit is further configured to auto-terminate a call on said first of said line interface modules if an access node coupled to said second of said line interface modules is unavailable.

13. The distributed call progress tone detection system as recited in claim 12 wherein a timeout period, associated with an availability of said access node, elapses before said main control unit auto-terminates said call.

14. The distributed call progress tone detection system as recited in claim 1 further comprising said application and wherein said application is selected from the group consisting of:
a non-predictive dialer,
a predictive dialer,
an answering machine dialer, and
a call center.

15. The distributed call progress tone detection system as recited in claim 14 wherein, upon receiving said notification from said main control unit, said application is configured to transmit information associated with said request to a terminal coupled to a third of said line interface modules that is associated with said second of said line interface modules.

16. The distributed call progress tone detection system as recited in claim 1 wherein said circuit is a circuit-switched matrix configured to control and selectively interconnect said line interface modules and said call progress tone detector.

17. A distributed call progress tone detection system couplable to a packet network, comprising:
a switching partition means couplable to said packet network and including:
line interface means that provides an interface to corresponding access nodes,
a call progress tone detection means that performs call progress tone detection analysis and generates an indication thereof, and
an input-output distributor means that employs a circuit means to interconnect said call progress tone detection means and a first of said line interface means to allow said call progress tone detection means to perform said call progress tone detection analysis with respect to said first of said line interface means; and
a main control unit means that receives requests from an application means over said packet network, transmits call and control processing commands to said switching partition means, creates an interconnection between said first of said line interface means and a second of said line interface means based on said indication and notify said application means of said interconnection.

18. The distributed call progress tone detection system as recited in claim 17 wherein said call progress tone detection means includes energy detection.

19. The distributed call progress tone detection system as recited in claim 17 wherein said call progress tone detection means includes energy detection with guard band elimination.

20. The distributed call progress tone detection system as recited in claim 17 wherein said call progress tone detection means further receives at least one tunable parameter and adjusts said call progress tone detection analysis on a call-by-call basis thereof.

21. The distributed call progress tone detection system as recited in claim 20 wherein said at least one tunable parameter is selected from the group consisting of:
a software answer detect time,
a hardware answer detect time,
a ring no answer time,
a minimum call answer time,
a recorded human speech detect time,
a maximum resource wait time, and
a pause wait time after speech detected.

22. The distributed call progress tone detection system as recited in claim 17 wherein said indication is selected from the group consisting of:
a busy tone,
a reorder tone,
a ring back tone with no answer,
a human speech with answer quickly,
a human speech with pause detected after speech,
a recorded human speech,
a facsimile/modem,
a Telco Intercept, and
a no energy detected before answer detect time expired.

23. The distributed call progress tone detection system as recited in claim 17 wherein said line interface means are dynamically configurable via program downloads.

24. The distributed call progress tone detection system as recited in claim 17 wherein said call progress tone detection means is embodied within at least one of said line interface means.

25. The distributed call progress tone detection system as recited in claim 17 wherein said call progress tone detection means is embodied within software downloaded to at least one of said line interface means.

26. The distributed call progress tone detection system as recited in claim 17 wherein said main control unit means further notifies said application means of said indication.

27. The distributed call progress tone detection system as recited in claim 17 wherein said call and control processing commands are selected from the group consisting of:
a no answer supervision command,
a use network answer supervision command,
a best try full analysis command, and
a full call progress analysis command.

28. The distributed call progress tone detection system as recited in claim 17 wherein said main control unit means also auto-terminates a call on said first of said line interface means if an access node coupled to said second of said line interface means is unavailable.

29. The distributed call progress tone detection system as recited in claim 28 wherein a timeout period, associated with an availability of said access node, elapses before said main control unit means auto-terminates said call.

30. The distributed call progress tone detection system as recited in claim 17 further comprising said application means and wherein said application means is selected from the group consisting of:
a non-predictive dialer,
a predictive dialer,
an answering machine dialer, and
a call center.

31. The distributed call progress tone detection system as recited in claim 30 wherein, upon receiving said notification from said main control unit means, said application means transmits information associated with said request to a terminal coupled to a third of said line interface means that is associated with said second of said line interface means.

32. The distributed call progress tone detection system as recited in claim 17 wherein said circuit means is a circuit-switched matrix means that controls and selectively interconnects said line interface means and said call progress tone detection means.

33. An enterprise call center with call progress tone detection coupled to a packet network, comprising:
 switching partitions coupled to said packet network and including:
  line interface modules that provide an interface to corresponding access nodes,
  a call progress tone detector that performs call progress tone detection analysis and generates an indication thereof, and
  an input-output distributor that employs a circuit to interconnect said call progress tone detector and a first of said line interface modules to allow said call progress tone detector to perform said call progress tone detection analysis with respect to said first of said line interface modules;
 a primary main control unit associated with a first location and coupled to said packet network; and
 a secondary main control unit associated with a second location and coupled to said packet network, at least one of said primary and secondary main control units receiving requests from an application over said packet network, transmitting call and control processing commands to at least one of said switching partitions, creating an interconnection between said first of said line interface modules and an agent coupled to one of said line interface modules in one of said switching partitions based on said indication and notifing said application of said interconnection.

34. The enterprise call center as recited in claim 33 wherein said call progress tone detector includes energy detection.

35. The enterprise call center as recited in claim 33 wherein said call progress tone detector includes energy detection with guard band elimination.

36. The enterprise call center as recited in claim 33 wherein said call progress tone detector further receives at least one tunable parameter and adjusts said call progress tone detection analysis on a call-by-call basis thereof.

37. The enterprise call center as recited in claim 36 wherein said at least one tunable parameter is selected from the group consisting of:
 a software answer detect time,
 a hardware answer detect time,
 a ring no answer time,
 a minimum call answer time,
 a recorded human speech detect time,
 a maximum resource wait time, and
 a pause wait time after speech detected.

38. The enterprise call center as recited in claim 33 wherein said indication is selected from the group consisting of:
 a busy tone,
 a reorder tone,
 a ring back tone with no answer,
 a human speech with answer quickly,
 a human speech with pause detected after speech,
 a recorded human speech,
 a facsimile/modem,
 a Telco Intercept, and
 a no energy detected before answer detect time expired.

39. The enterprise call center as recited in claim 33 wherein said line interface modules are dynamically configurable via program downloads.

40. The enterprise call center as recited in claim 33 wherein said call progress tone detector may be embodied within at least one of said line interface modules.

41. The enterprise call center as recited in claim 33 wherein said call progress tone detector may be embodied within software downloaded to at least one of said line interface modules.

42. The enterprise call center as recited in claim 33 wherein said at least one of said primary and secondary main control units further notifies said application of said indication.

43. The enterprise call center as recited in claim 33 wherein said call and control processing commands are selected from the group consisting of:
 a no answer supervision command,
 a use network answer supervision command,
 a best try full analysis command, and
 a full call progress analysis command.

44. The enterprise call center as recited in claim 33 wherein said at least one of said primary and secondary main control units further auto-terminates a call on said first of said line interface modules if all of said line interface modules, in each of said switching partitions, associated with agents are unavailable.

45. The enterprise call center as recited in claim 44 wherein a timeout period, associated with an availability of said agents, elapses before said at least one of said primary and secondary main control units auto-terminates said call.

46. The enterprise call center as recited in claim 33 further comprising said application and wherein said application is selected from the group consisting of:
 a non-predictive dialer,
 a predictive dialer,
 an answering machine dialer, and
 a call center.

47. The enterprise call center as recited in claim 46 wherein, upon receiving said notification from said main control unit, said application transmits information associated with said request to a terminal coupled to another of said line interface modules in said one of said switching partitions that is associated with said agent coupled to said one of said line interface modules in said one of said switching partitions.

48. The enterprise call center as recited in claim 33 wherein said circuit is a circuit-switched matrix that controls and selectively interconnects said line interface modules and said call progress tone detector.

* * * * *